United States Patent
Park et al.

(10) Patent No.: US 12,428,564 B2
(45) Date of Patent: Sep. 30, 2025

(54) COMPLEX FUNCTIONAL PIGMENT AND MANUFACTURING METHOD THEREOF

(71) Applicant: UIF (University Industry Foundation), Yonsei University, Seoul (KR)

(72) Inventors: Hyung-Ho Park, Seoul (KR); Younghun Kim, Gyeonggi-do (KR); Taehee Kim, Seoul (KR); Haryeong Choi, Seoul (KR); Jihun Lee, Gyeonggi-do (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 906 days.

(21) Appl. No.: 17/668,324

(22) Filed: Feb. 9, 2022

(65) Prior Publication Data
US 2022/0267606 A1    Aug. 25, 2022

(30) Foreign Application Priority Data

Feb. 10, 2021  (KR) .................. 10-2021-0019200

(51) Int. Cl.
| | |
|---|---|
| C09C 1/36 | (2006.01) |
| C09C 3/06 | (2006.01) |
| C09C 3/10 | (2006.01) |
| C09D 7/62 | (2018.01) |

(52) U.S. Cl.
CPC .......... C09C 1/3676 (2013.01); C09C 1/3661 (2013.01); C09C 3/063 (2013.01); C09C 3/10 (2013.01); C09D 7/62 (2018.01); *C01P 2002/52* (2013.01); *C01P 2006/12* (2013.01); *C01P 2006/60* (2013.01)

(58) Field of Classification Search
None
See application file for complete search history.

(56) References Cited

U.S. PATENT DOCUMENTS

| | | | | |
|---|---|---|---|---|
| 2,166,082 | A | * | 7/1939 | Washburn .......... C09C 1/3692 106/439 |
| 2009/0082479 | A1 | | 3/2009 | Cho |
| 2010/0062032 | A1 | * | 3/2010 | Sharma .............. B01J 37/0215 427/372.2 |
| 2015/0030968 | A1 | | 1/2015 | Schwab et al. |
| 2018/0127277 | A1 | | 5/2018 | Kim et al. |
| 2021/0376222 | A1 | | 12/2021 | Park et al. |

FOREIGN PATENT DOCUMENTS

| | | | |
|---|---|---|---|
| CN | 103788720 | A * | 5/2014 |
| JP | 2001-222913 | | 8/2001 |
| KR | 10-2009-0030635 | | 3/2009 |
| KR | 10-2011-0045732 | | 5/2011 |
| KR | 10-2014-0143756 | | 12/2014 |
| KR | 10-2015-0114811 | | 10/2015 |
| KR | 10-2016-0141669 | | 12/2016 |
| KR | 10-2017-0003401 | | 1/2017 |
| KR | 10-1832663 | | 2/2018 |
| KR | 10-2019-0119203 | | 10/2019 |

OTHER PUBLICATIONS

Machine Translation of CN-103788720-A (no date).*
U.S. Appl. No. 17/939,555, filed Sep. 7, 2022, by Park et al. (copy not provided) (Copy not submitted herewith pursuant to the waiver of 37 C.F. R. § 1.98(a)(2)(iii) issued by the Office on Sep. 21, 2004).
Desario et al., "Plasmonic enhancement of visible-light water splitting with Au—TiO2 composite aerogels," Nanoscale (2013) DOI: 10.1039/C3NR01429K.
Fan et al., "Piezoluminescence from ferroelectric Ca3Ti2O7:Pr3+ long-persistent phosphor," Optics Express (2017) 25(13):14238.

* cited by examiner

*Primary Examiner* — Michael J Feely
(74) *Attorney, Agent, or Firm* — Sughrue Mion, PLLC

(57) ABSTRACT

The complex functional pigment according to the present invention can effectively functionalize paints while minimizing the content of pigment added to a paint composition, that is, the solid content of a paint composition, for functionalization such as heat insulation, sound insulation, beautification, weather resistance, durability, chemical resistance, antibiotic properties, surface hydrophilization/hydrophobicity and the like, and even when added in a high content in the paint composition, it has an effect of excellent dispersibility. In addition, since the color realization area of a coating film is wide, various colors can be implemented, and it also has an effect that it is easy to adjust to the desired color.

8 Claims, 1 Drawing Sheet

COMPLEX FUNCTIONAL PIGMENT AND MANUFACTURING METHOD THEREOF

CROSS-REFERENCE TO RELATED APPLICATIONS

This application claims priority to and the benefit of Korean Patent Application No. 10-2021-0019200, filed on Feb. 10, 2021, the disclosure of which is incorporated herein by reference in its entirety.

TECHNICAL FIELD

The present invention relates to a complex functional pigment that is used in paints.

BACKGROUND ART

By forming a coating film on the exterior of the object to be coated, the paint prolongs the lifespan by preventing aging and oxidation of various raw materials or finished products, and provides functionality suitable for special purposes such as waterproofing, antifouling, fireproofing, electromagnetic wave shielding, heal insulation and the like, and it is a key material for implementing colors.

A general paint composition is prepared by mixing a pigment that implements color to a resin, additives for imparting various functionalities, and a solvent and resin to form a uniform coating film. Such a paint composition implements its performance only when it is applied and dried on the target surface to form a coating film.

Functional pigments and the like are mainly used as additives that allow the coating film to adhere to the object to be coated and implement protection and beautification, and this can improve the hiding power, coating durability, skin-swelling properties and the like, along with color implementation.

As described above, when it is desired to impart or improve performance required for a paint, additives are additionally mixed with the paint composition to provide functionality. Recently, there is a method of adding an aerogel to a paint composition as a method of functionalizing the paint, which is mainly applied to improve or impart heat insulation and beautification properties. In addition to the above, the aerogel can provide functions such as heat insulation, sound insulation, antibiotic properties, water repellency and the like.

However, when an aerogel is added to a paint composition to improve or impart functionality, the content of an aerogel must be quite high in order to implement effective functionality, and when the solid content of the paint composition is high, there is a limitation in that it is not uniformly dispersed or other properties of the paint are deteriorated. Therefore, due to the nature of the paint, in the case of aerogels manufactured in the prior art, since it is practically difficult to increase the content for effective functional implementation, there is a problem in that the functionality of the pigment cannot be effectively applied to the paint.

RELATED ART DOCUMENTS

Patent Documents (Patent Document 1) Korean Patent Application Laid-Open No. 10-2015-01114811

DISCLOSURE

Technical Problem

An object of the present invention is to provide a complex functional pigment that can effectively functionalize paints while minimizing the content of pigment added to a paint composition, that is, the solid content of a paint composition, for functionalization such as heat insulation, sound insulation, beautification, weather resistance, durability, chemical resistance, antibiotic properties, surface hydrophilization/hydrophobicity and the like, and that has excellent dispersibility even when added in a high content in the paint composition, and a manufacturing method thereof.

Another object of the present invention is to provide a complex functional pigment that has a wide color realization area of a coating film such that various colors can be implemented, and that is also easy to adjust to the desired color, and a manufacturing method thereof.

Technical Solution

The complex functional pigment according to the present invention includes a titanium oxide aerogel having a BET specific surface area of 50 to 2,000 $m^2/g$ and absorption in the visible region, and doped with one or two or more metals selected from the group consisting of noble metals and transition metals.

In one example of the present invention, the noble metal and the transition metal may be one or two or more metals selected from the group consisting of Au, Ag, Pt, Pd, Rh, Cu, Fe, Mg, V, Cr, Sr and Nb.

In one example of the present invention, Ti, noble metal and transition metal included in the aerogel may have single-phase elemental uniformity.

In one example of the present invention, the aerogel may be manufactured by gelation of titania sol with a metal precursor including one or two or more metals selected from the group consisting of noble metals and transition metals.

In one example of the present invention, the titanium oxide aerogel may have mesopores and macropores.

The aerogel according to one example of the present invention may have absorption characteristics in the entire wavelength range of 400 nm to 800 nm in the absorption spectrum of visible light.

The aerogel according to one example of the present invention may further include a graphene-based compound.

In one example of the present invention, the graphene-based compound may be nitrogen-doped.

The aerogel according to one example of the present invention may be surface-coated with a hydrophilic polymer anchored into the aerogel particles on the particle surface.

The paint composition according to the present invention may include the complex functional pigment.

The method for manufacturing a complex functional pigment according to the present invention includes (a1) preparing a first solution including a titanium precursor; (b1) mixing an acid with the first solution and hydrolyzing to prepare a first sol; (c1) preparing a second solution including a metal precursor including one or two or more metals selected from the group consisting of noble metals and transition metals; and (d) preparing a reaction solution by mixing the first sol with the second solution and performing a condensation reaction to manufacture a gel.

The method for manufacturing a complex functional pigment according to the present invention may further include (e) aging at high temperature, after step (d).

The method for manufacturing a complex functional pigment according to the present invention may further include (f) removing a solvent in the supercritical state, after step (e).

In one example of the present invention, the metal precursor may be manufactured by adding $C_2$-$C_4$ alkylene oxide to a metal halogen compound.

In one example of the present invention, the first sol may further include a graphene-based compound.

The method for manufacturing a complex functional pigment according to the present invention may further include (a2) preparing a third solution including a titanium precursor; and (b2) hydrolyzing the third solution to manufacture a second sol, wherein a gel may be manufactured by mixing the second sol with the reaction solution in which the condensation reaction has partially progressed in step (d) and then performing a condensation reaction.

In one example of the present invention, the third solution may further include a cationic surfactant.

In one example of the present invention, step (d) may be carried out in a temperature range of 0 to 50° C.

Advantageous Effects

The complex functional pigment according to the present invention can effectively functionalize paints while minimizing the content of pigment added to a paint composition, that is, the solid content of a paint composition, for functionalization such as heat insulation, sound insulation, beautification, weather resistance, durability, chemical resistance, antibiotic properties, surface hydrophilization/hydrophobicity and the like, and even when added in a high content in the paint composition, it has an effect of excellent dispersibility.

In addition, since the complex functional pigment according to the present invention has a wide color realization area of a coating film, various colors can be implemented, and it also has an effect that it is easy to adjust to the desired color.

DESCRIPTION OF DRAWINGS

FIG. 1 is an image of observing the pigment particles manufactured in Example 2.

MODES OF THE INVENTION

Hereinafter, the complex functional pigment according to the present invention and the manufacturing method thereof will be described in detail with reference to the accompanying drawings.

The drawings described in the present specification are provided as examples in order to sufficiently convey the spirit of the present invention to those skilled in the art. Therefore, the present invention is not limited to the drawings presented and may be embodied in other forms, and the drawings may be exaggerated and illustrated to clarify the spirit of the present invention.

Unless otherwise defined, the technical terms and scientific terms used in the present specification have the meanings commonly understood by those of ordinary skill in the art to which the present invention pertains, and in the following description and accompanying drawings, the descriptions of well-known functions and configurations that may unnecessarily obscure the gist of the present invention will be omitted.

A singular form of a term used herein may be construed to include a plural form as well unless otherwise indicated.

The term itself referring to each step, such as a, b, c, . . . ; a1, a2, a3, . . . ; b1, b2, b3, . . . ; etc. as referred to herein, is only used to refer to a certain step, means, etc., and should not be construed as meaning an order relationship between the respective objects referred to by the terms.

Unless otherwise specified, the unit of % used in the present specification means wt. % unless otherwise defined.

Conventionally, when a general titanium oxide aerogel is used as a pigment to improve or impart the functionality of a paint, the content of the titanium oxide aerogel must be quite high in order to effectively implement the functionality, but when the pigment is present in a relatively high content in a paint composition, it causes problems such as not being uniformly dispersed, lowering other properties of the paint or the like. In particular, in a situation in which pigments must be added in a high content to a paint according to a required color, it was not easy to implement a desired color in the paint for the above reasons.

Accordingly, the present invention is directed to providing a complex functional pigment with the effect of exhibiting photocatalytic properties in the visible region as well as freely controlling the color in a wide color range just by doping a small amount of metal into titanium oxide, by acting as a pigment through light absorption in the wavelength region of visible light, and a manufacturing method thereof.

As a means for implementing the above effect, the complex functional pigment according to the present invention has a BET specific surface area of 50 to 2,000 $m^2/g$ and absorption in the visible region, and includes a titanium oxide aerogel doped with one or two or more metals selected from the group consisting of noble metals and transition metals.

In particular, the present invention is capable of providing a pigment that may be easily controlled in various colors by having light absorption in the visible region as titanium oxide is doped with a noble metal or a transition metal. Specifically, the introduction of a noble metal or a transition metal into titanium oxide affects the photoreactivity, charge carrier recombination rate and bandgap control, thereby exhibiting high light absorption in the visible region. In this case, the color of the pigment may be controlled by inducing a red shift as the content of the doped metal increases.

According to a preferred aspect, the titanium oxide aerogel doped with a noble metal or a transition metal according to the present invention may have single-phase elemental uniformity. Specifically, in titanium oxide doped with a noble metal or a transition metal, when titanium and a noble metal or a transition metal have single-phase elemental uniformity, it has excellent color uniformity, and color may be implemented only with a small amount of metal doping, and it is also possible to precisely control the color change of the pigment according to the amount of metal doping. As a preferred example for allowing titanium and the noble metal or transition metal to have single-phase elemental uniformity, the aerogel may be manufactured by gelation of a metal precursor and titania sol. The manufacturing method thereof will be described in more detail below.

The noble metal and transition metal are not particularly limited as long as these are doped with titanium oxide to implement light absorption in the visible region, and for example, these may be metals including one or two or more selected from Au, Ag, Pt, Pd, Rh, Cu, Fe, Mg, V, Cr, Sr, Nb and the like.

The doping content of the noble metal and transition metal is not limited as long as it can implement the above-described effect, and for example, the doped metal may be contained at 0.001 to 20 wt. % of the total weight of the aerogel. When this is satisfied, there is an effect that it is easy to control the required color by controlling the usage amount of doped metal while implementing the above-described effect.

As described above, the aerogel may absorb a wavelength in the visible region, and as an example of a specific range of the wavelength in the visible region, the aerogel may have a visible light absorption property in the entire wavelength range of 400 nm to 800 nm in the absorption spectrum of visible light.

The average particle diameter of the aerogel is not limited as long as it may be used as a pigment and implement the above-described effects, and for example, it may be 0.5 to 800 μm, and specifically, 1 to 100 μm. However, this is only described as a preferred example, and the present invention may not be construed as being limited thereto.

In addition, as described above, the complex functional pigment including the aerogel according to the present invention has light absorption at a wavelength in the visible region such that color control is easy, and it has excellent photocatalytic properties for adsorbing and decomposing volatile organic compounds.

The aerogel includes a plurality of internal pores so as to have a BET specific surface area within the above-described range, and it may be preferable for the pores of the aerogel to include mesopores and macropores in terms of being able to effectively perform the adsorption and decomposition of volatile organic compounds by photocatalytic properties. In this case, the mesopores may have a size of 2 to 50 nm, and the macropores may have a size of more than 50 nm, and specifically, a size of 50 nm to 30 μm. According to a preferred aspect, the mesopores may be mesopores aligned by a template mold. Since the complex functional pigment including the aerogel has aligned mesopores, it may have a higher specific surface area and have more excellent adsorption properties of volatile organic compounds as well as the function of the pigment, and it is preferable because it is possible to effectively remove the adsorbed volatile organic compounds in the wavelength region of visible light.

According to a non-limiting aspect, when the aerogel further includes a graphene-based compound, the UV blocking property is remarkably improved, thereby minimizing the deterioration of physical properties of the coating film due to UV rays so as to increase durability, and excellent photocatalytic properties may be effectively implemented. Accordingly, there is an effect that the initial characteristic of decomposing volatile organic compounds with high efficiency may be maintained continuously for a long period of time. In addition, it is possible to increase the chemical stability of polymers and organic substances contained in the paint that may be used together with the pigment. Specifically, when the graphene-based compound is additionally used, the graphene-based compound may be physically incorporated and attached to the inside of the pores of the titanium oxide aerogel, and specifically, macropores. The graphene-based compound may be specifically graphene oxide, and in the case of liquid crystalline graphene oxide, it is preferable because it may have superior UV blocking properties.

When the graphene-based compound is used, the usage amount is not limited as long as it may implement the above-described effects such as UV protection, catalytic properties, chemical stability and the like, and for example, the graphene-based compound may be included at 0.1 to 2 wt. % of the total weight of the titanium oxide aerogel.

When the graphene-based compound is used, more preferably, it is preferable to use a nitrogen-doped graphene-based compound in terms of further improving UV protection properties. Since the nitrogen-doped graphene-based compound is specifically disclosed in Korean Patent Laid-Open No. 10-1832663, it is sufficient to refer to the same. As a specific example, it may be a graphene-based compound doped by nitrogen which binds to at least one graphene functional group selected from the group consisting of a carbonyl group, an ether group and an epoxy group. The graphene-based compound may be manufactured by including the steps of spraying a mixture including a compound containing 200 to 1,000 parts by weight of nitrogen based on 100 parts by weight of graphene oxide to form a graphene structure; and reducing the graphene structure. However, this is only described as a preferred example, and the present invention may not be construed as being limited thereto.

The average particle diameter of the graphene-based compound is not limited as long as it may be incorporated into the pores of the titanium oxide aerogel, and specifically, inside the macropores while implementing the above-described effects, and for example, it may be 0.01 to 10 μm, and specifically, 0.1 to 1 μm, but is not limited thereto.

The complex functional pigment including a metal-doped titanium oxide aerogel according to the present invention is applied to a paint and has high dispersibility, and when a hydrophilic polymer is anchored into the aerogel particles and surface-coated on the particle surface of the aerogel, it may be more preferable in terms of being able to significantly improve the structural stability and durability of the aerogel while further improving dispersibility.

Various types of the hydrophilic polymer may be used as long as it is possible to impart hydrophilicity and implement the above-described effects, and it may be selected from hydrophilic polymers having solubility or dispersibility in water. Specifically, it may be a cationic polymer or an anionic polymer, and preferably, an anionic polymer.

As an example of the anionic polymer, it may be preferable to include any one or two or more selected from polyacrylic acid, a polyacrylic acid-based copolymer, sulfonated cellulose and alginic acid, but is not limited thereto. In this case, the weight average molecular weight of the polymer is not particularly limited as a level capable of implementing the above-described effects, and for example, it may be 10,000 to 300,000 g/mol. However, this is only described as a preferred example, and the present invention may not be construed as being limited thereto.

In addition, the present invention may provide a paint composition including a complex functional pigment including the metal-doped titanium oxide aerogel. Specifically, the paint composition according to the present invention may include a base resin and the complex functional pigment, and certainly, it may further include various additives. As a specific example, the composition ratio of the paint composition is not particularly limited, and for example, the paint composition may include 50 to 95 wt. % of the base resin and 0.01 to 40 wt. % of the complex functional pigment based on the solid content, and the remaining amount of the additives may be included.

As the base resin, various known base resins in the paint field, such as an acrylic resin, a silicone resin, a urethane resin, a urea resin, an epoxy resin, an ester resin and the like may be used.

As the additives, there are various types of additives as long as these are for imparting or improving a required function, and for example, film forming agents, dispersants, strength enhancers, fillers, thickeners, viscosity stabilizers, defoamers, preservatives, antibacterial agents, anti-settling agents, anti-freezing agents, pH adjusting agents and the like may be used alone or in combination. When such additives are further used, the usage amount is not particularly limited because it may be appropriately adjusted, and for example, 0.01 to 10 parts by weight, and specifically, 0.1 to 5 parts by weight may be used based on 100 parts by weight of the base resin. However, this is only described as a preferred example, and the present invention may not be construed as being limited thereto.

Hereinafter, the manufacturing method of the complex functional pigment according to the present invention will be described in detail, and the pigment having the above-described properties, effects and physical properties is manufactured through the manufacturing method described below.

The manufacturing method of a complex functional pigment including a titanium oxide aerogel according to the present invention includes the steps of: (a1) preparing a first solution including a titanium precursor; (b1) mixing an acid with the first solution and hydrolyzing to prepare a first sol; (c1) preparing a second solution including a metal precursor including one or two or more metals selected from the group consisting of noble metals and transition metals; and (d) preparing a reaction solution by mixing the first sol with the second solution and performing a condensation reaction to manufacture a gel.

As described above, by hydrolyzing a titanium precursor using an acid as a catalyst to prepare a first sol, mixing the second solution including the metal precursor and the first sol and performing a condensation reaction to manufacture a gel, it is possible to manufacture a titanium oxide aerogel.

In particular, by gelating the first sol and the second solution by condensation reaction, titanium, noble metals and transition metals may have single-phase elemental uniformity, thereby implementing excellent pigment properties and photocatalytic properties as described above.

More preferably, the condensation reaction of step (d) may be carried out in a temperature range of 0 to 50° C., and preferably, 0 to 5° C. In particular, when the condensation reaction is carried out in a temperature range of 0 to 5° C., it may be induced to have the single-phase elemental uniformity of the titanium oxide aerogel. In addition, noble metals or transition metals do not remain in an unreacted state, and substantially all noble metals and transition metals are doped in the titanium oxide aerogel to exhibit excellent pigment characteristics and photocatalytic properties, and it is possible to secure excellent chemical stability and structural stability.

The acid is not particularly limited as long as it acts as a catalyst to hydrolyze a titanium precursor, and for example, it may be an inorganic acid or an aqueous solution of inorganic acid including any one or two or more selected from nitric acid, sulfuric acid, hydrochloric acid and the like.

The titanium precursor may include any one or two or more selected from the group consisting of titanium methoxide, titanium ethoxide, titanium propoxide, titanium butoxide, titanium isopropoxide, titanium acetate, titanium acetate hydrate, titanium acetylacetonate, titanium fluoride, titanium chloride, titanium bromide, titanium iodide, titanium nitrate, titanium sulfate, titanium oxyfluoride, titanium oxychloride, titanium oxybromide, titanium oxyiodide and the like. However, this is only described as a specific example, and the present invention may not be construed as being limited thereto.

The metal precursor is not limited as long as it can dope titanium oxide with the corresponding metal, and for example, it may be a variety of compounds such as halides such as chloride, bromide or iodide, hydrates, nitrides, sulfides, oxides or the like. As a specific example, it is preferable that the metal precursor is prepared by adding alkylene oxide, specifically, C2-C4 alkylene oxide to a metal halide compound. If this is satisfied, it is possible to secure excellent chemical stability and structural stability by forming a uniform metal precursor solution by the addition of C2-C4 alkylene oxide in the sol-gel process, and also forming a stable metal oxide sol to form a metal oxide gel network. Specific examples of the C2-C4 alkylene oxide may include any one or two or more selected from ethylene oxide, propylene oxide, butylene oxide and the like.

The first solution, the second solution and the third solution to be described below include each precursor and a solvent, and the solvent is not particularly limited as long as each precursor can be dissolved, and an example may be ethanol. In this case, the composition ratio of each solution is not particularly limited, and for example, 0.1 to 10 parts by weight of the precursor may be used based on 100 parts by weight of the solvent. However, this is only described as a specific example, and the present invention may not be construed as being limited thereto.

The manufacturing method of a complex functional pigment according to an example of the present invention may further include the step of e) aging at high temperature, after step (d). Specifically, the aging may be a heat treatment of the prepared aerogel at a high temperature of 40 to 90° C. for 6 to 48 hours, through which the structural stability of the aerogel may be further strengthened. However, this is only described as a preferred example, and the present invention may not be construed as being limited thereto.

The manufacturing method of a complex functional pigment according to the present invention may further include the step of (f) removing a solvent in the supercritical state, after step (e), through which the titanium oxide aerogel having a specific surface area in the above-mentioned range may be manufactured more stably.

The manufacturing method of a complex functional pigment according to an example of the present invention may further include the steps of: (a2) preparing a third solution including a titanium precursor; and (b2) hydrolyzing the third solution to manufacture a second sol, wherein a gel may be manufactured by mixing the second sol with the reaction solution in which the condensation reaction has partially progressed in step (d) and then performing a condensation reaction.

Preferably, the second sol may further include the above-described graphene-based compound, and the graphene-based compound may be incorporated into the macropores of the aerogel. Through this, it is possible to minimize the deterioration and shortening of the lifespan due to UV exposure when applied to a paint by providing UV protection, and to perform the adsorption and decomposition of volatile organic compounds more effectively.

The manufacturing method of a complex functional pigment according to an example of the present invention may further include the step of applying the hydrophilic polymer to the surface of the manufactured aerogel and drying, after step (d). Through this, the hydrophilic polymer on the particle surface of the aerogel is anchored into the aerogel particles and surface-coated, and thus, dispersibility may be further improved.

In an example of the present invention, a cationic surfactant may be further included upon the manufacture of the aerogel, and specifically, the third solution may be used by further including a cationic surfactant. As the third solution includes a cationic surfactant, a structure in which the mesopores having a size of 2 to 50 nm are regularly or irregularly arranged may be obtained through the self-assembly of the cationic surfactant. In addition, since the hydrophilic head group of the cationic surfactant has a cationic group, the water dispersibility of the aerogel is further improved, and in particular, when used together with the anionic polymer as the hydrophilic polymer, complexing with the anionic polymer may be easy and the water dispersibility may be further improved.

As the cationic surfactant, materials known in the paint field may be used, and it may preferably be an aliphatic ammonium salt. For example, it may include any one or two or more selected from cetyltrimethylammonium bromide, hexadecyltrimethylammonium bromide, benzalkonium chloride, cetyltrimethylammonium chloride, benzododecyldimethylammonium bromide, dodecyltrimethylammonium chloride and the like. However, this is only described as a specific example, and the present invention may not be construed as being limited thereto.

Hereinafter, the present invention will be described in detail with reference to examples, but these examples are for describing the present invention in more detail, and the scope of the present invention is not limited by the examples below.

Example 1

As a titanium precursor, 4 mL of titanium isopropoxide was mixed with 20 mL of anhydrous ethanol to prepare a uniform titanium isopropoxide first solution. 0.25 mL of nitric acid and 0.9 mL of distilled water were mixed with the titanium isopropoxide first solution and stirred to prepare a titania sol, which is a first sol, through hydrolysis of titanium isopropoxide.

In addition, 0.5 mg of gold chloride trihydrate was mixed with 4 mL of anhydrous ethanol to prepare an aqueous gold chloride solution. Then, after 0.1 mL of propylene oxide was mixed with the aqueous gold chloride solution, a gold chloride precursor solution, which is a second solution, was prepared through a ring-opening reaction. After mixing the titania sol (first sol) and the gold chloride precursor solution (second solution) at a weight ratio of 5:1, gelation was induced while maintaining the reaction temperature at 4° C. in an ice bath for 1 hour. After the gelation reaction was completed, it was aged at 60° C. for one day, and solvents such as ethanol and water were completely removed in the supercritical state to manufacture metal-doped titania aerogel pigment particles.

Example 2

Except that 0.5 g of gold chloride trihydrate was mixed with 4 mL of anhydrous ethanol in Example 1 to prepare an aqueous gold chloride solution and titania sol and a gold chloride precursor solution were mixed at a weight ratio of 2.5:1, metal-doped titania aerogel pigment particles were manufactured in the same manner as in Example 1.

Example 3

Except that 0.5 g of gold chloride trihydrate was mixed with 4 mL of anhydrous ethanol in Example 1 to prepare an aqueous gold chloride solution and titania sol and a gold chloride precursor solution were mixed at a weight ratio of 1:1, metal-doped titania aerogel pigment particles were manufactured in the same manner as in Example 1.

Example 4

Except that instead of gold chloride trihydrate, 0.65 mg of platinum (IV) chloride was mixed with 5 mL of anhydrous ethanol in Example 1 to prepare a platinum chloride aqueous solution, metal-doped titania aerogel pigment particles were manufactured in the same manner as in Example 1.

Example 5

Except that instead of gold chloride trihydrate, 0.35 mg of iron chloride hexahydrate was mixed with 5 mL of anhydrous ethanol in Example 1 to prepare an aqueous iron chloride solution, metal-doped titania aerogel pigment particles were manufactured in the same manner as in Example 1.

Example 6

After mixing the titania sol (first sol) prepared in the same manner as in Example 1 with the gold chloride precursor solution (second solution) prepared in the same manner as in Example 1 at a weight ratio of 5:1, the reaction temperature was maintained at 4° C. in an ice bath for 1 hour to induce partial gelation.

Meanwhile, as a titanium precursor, 4 mL of titanium isopropoxide was mixed with 20 mL of anhydrous ethanol to prepare a uniform titanium isopropoxide third solution, and 0.25 mL of nitric acid, 0.5 g of cetyltrimethylammonium bromide and 0.9 mL of distilled water were mixed with the third solution and stirred to prepare a titania sol including a surfactant as a second sol through hydrolysis of titanium isopropoxide.

After a uniform solution was prepared by mixing 10 mL of a 0.5 wt. % aqueous solution of graphene oxide (nitrogen content: 3.2 atom %) doped with nitrogen in the titania sol (second sol), it was added to the partially gelated solution and mixed. In this case, the nitrogen-doped graphene oxide was prepared according to the method disclosed in Korean Patent Laid-Open No. 1832663. In the mixed solution, gelation was induced while maintaining the reaction temperature at 4° C. in an ice bath for 24 hours.

After the gelation reaction was completed, it was aged at 60° C. for one day, and the solvent was completely removed in the supercritical state to manufacture metal-doped titania aerogel pigment particles.

Example 7

After performing the steps of applying a 5 wt. % aqueous solution of polyacrylic acid (weight average molecular weight: 132,000 g/mol) to the titania aerogel pigment particles manufactured in Example 6 and drying twice, titania aerogel pigment particles coated with polyacrylic acid were manufactured.

Comparative Example 1

The titania sol (first sol) prepared in the same manner as in Example 1 was induced to be gelated while maintaining the reaction temperature at 4° C. in an ice bath for 1 hour. After the gelation reaction was completed, it was aged at 60° C. for one day, and the solvent was completely removed in the supercritical state to manufacture titania aerogel pigment particles.

Then, the titania aerogel pigment particles were mixed with water to prepare 50 mL of an aqueous dispersion at a concentration of 10 wt. % in a flask and filled, followed by mixing gold chloride trihydrate. In this case, mixing was performed such that titania was 99.9 wt. % and gold chloride trihydrate was 0.1 wt. %, and the mixed reaction solution was subjected to ultrasonic treatment at 40 KHz and 500 Watt for 30 minutes.

After the ultrasonic treatment was completed, the reaction solution was washed and filtered three times, and then dried at a temperature of 80° C. for 24 hours. Through this process, metal-doped titania aerogel pigment particles were manufactured.

Comparative Example 2

The titania sol (first sol) prepared in the same manner as in Example 1 was induced to be gelated while maintaining the reaction temperature at 4° C. hour in an ice bath for 1. After the gelation reaction was completed, it was aged at 60° C. for one day, and the solvent was completely removed in the supercritical state to manufacture titania aerogel particles.

Experimental Example

<Measurement of BET Specific Surface Area>

The Brunauer-Emmett-Teller (BET) specific surface areas were measured for the titania aerogel pigments manufactured in Examples 1 to 7 and Comparative Examples 1 and 2 as samples.

Specifically, after placing the sample in a sample tube, nitrogen gas is injected to adsorb and desorb nitrogen gas to the sample, and the monolayer adsorption point is found through the isothermal adsorption curve, and the surface area of the sample may be calculated therefrom.

TABLE 1

|  | Example | | | | | | | Comparative Example | |
| --- | --- | --- | --- | --- | --- | --- | --- | --- | --- |
|  | 1 | 2 | 3 | 4 | 5 | 6 | 7 | 1 | 2 |
| Specific surface area (m$^2$/g) | 851.2 | 844.5 | 821.7 | 867.9 | 832.2 | 722.8 | 704.2 | 850.6 | 849.2 |
| Pore volume (cc/g) | 1.43 | 1.39 | 1.41 | 1.32 | 1.37 | 2.93 | 2.87 | 1.42 | 1.43 |
| Density (g/cm$^3$) | 0.05 | 0.06 | 0.06 | 0.08 | 0.08 | 0.03 | 0.05 | 0.12 | 0.06 |

<Measurement of Dispersibility>

After 20 parts by weight of the titania aerogel pigments manufactured in Examples 1 to 7 and Comparative Examples 1 and 2, and 100 parts by weight of an acrylic emulsion were mixed based on 100 parts by weight of water and stirred at high speed at 1,500 rpm to prepare paint compositions, the dispersibility of the paint compositions was tested. In order to determine the stability of the dispersion, after high-speed stirring, if separation of the titania aerogel pigment into the upper layer was observed within 5 minutes, high-speed stirring was further performed, and if separation into the upper layer was not observed within 5 minutes, it was determined that a stable dispersion was prepared and stirring was stopped. The total high-speed stirring time required until a stable dispersion was prepared is described in Table 2 below.

<Color Measurement>

The colors of the titania aerogel pigments manufactured in Examples 1 to 7 and Comparative Examples 1 and 2 were visually observed.

<Stability when Used in Coating Films>

Based on 100 parts by weight of water, 20 parts by weight of the titania aerogel pigments manufactured in Examples 1 to 7 and Comparative Examples 1 and 2, and 100 parts by weight of an acrylic emulsion were mixed, and the paint compositions prepared by high-speed stirring at 1,500 rpm were applied to substrates and dried to manufacture coating film samples. Then, a harsh test was conducted in which the coating film samples were irradiated with ultraviolet rays for a certain period of time. In this case, the degree of cracking and peeling of the coating film was measured, and the case where there was no cracking and peeling was evaluated as 5 points, and the case of the most severe cracking and peeling was evaluated as 1 point.

Table 2 below shows the dispersibility, colors and coating film stability of the aerogel pigments manufactured in Examples 1 to 7 and Comparative Examples 1 and 2.

TABLE 2

| | Example | | | | | | | Comparative Example | |
|---|---|---|---|---|---|---|---|---|---|
| | 1 | 2 | 3 | 4 | 5 | 6 | 7 | 1 | 2 |
| Total dispersion time | 30 min | 30 min | 30 min | 30 min | 30 min | 20 min | 5 min | 30 min | 30 min |
| Coating film stability | 4 | 4 | 4 | 4 | 4 | 4 | 5 | 3 | 1 |

As a result of dispersibility measurement, in Examples 1 to 5, stable dispersions were prepared only by high-speed stirring at 1,500 rpm for 30 minutes, and in Example 6, a stable dispersion was prepared after high-speed stirring for 20 minutes, and in Example 7, it was shown that a stable dispersion was prepared only by high-speed stirring for a short time of 5 minutes.

As a result of color measurement, in the examples, the doping amount of the metal was set differently, and Example 1 showed blue color, and as illustrated in FIG. 1, Example 2 showed yellow color, and Example 3 showed red color. In addition, Examples 4 and 5 showed green and blue colors, respectively, and it was confirmed that the titanium oxide aerogel particles in all of the examples had uniform colors without color deviation. On the other hand, Comparative Example 1 showed cyan color, and the color was not uniform, and Comparative Example 2 showed white color.

The invention claimed is:

1. A method for manufacturing a complex functional pigment, comprising:
   (a1) preparing a first solution comprising a titanium precursor;
   (b1) mixing an acid with the first solution and hydrolyzing to prepare a first sol;
   (c1) preparing a second solution comprising a metal precursor comprising one or two or more metals selected from the group consisting of noble metals; and
   (d) preparing a reaction solution by mixing the first sol with the second solution and performing a condensation reaction to manufacture a gel.

2. The method of claim 1, further comprising (e) aging at high temperature, after step (d).

3. The method of claim 2, further comprising (f) removing a solvent in the supercritical state, after step (e).

4. The method of claim 1, wherein the metal precursor is manufactured by adding $C_2$-$C_4$ alkylene oxide to a metal halogen compound.

5. The method of claim 4, wherein the first sol further comprises a graphene-based compound.

6. The method of claim 1, further comprising:
   (a2) preparing a third solution comprising a titanium precursor; and
   (b2) hydrolyzing the third solution to manufacture a second sol,
   wherein a gel is manufactured by mixing the second sol with the reaction solution in which the condensation reaction has partially progressed in step (d) and then performing a condensation reaction.

7. The method of claim 6, wherein the third solution further comprises a cationic surfactant.

8. The method of claim 1, wherein step (d) is carried out in a temperature range of 0 to 50° C.

* * * * *